Aug. 12, 1924.  1,504,405

I. F. WEBB

SAFETY SHAFT COUPLING

Filed March 18, 1922

WITNESSES:
Godfrey Pecina
John F. Heine

INVENTOR
Irving F. Webb
BY
Henry J. Miller
ATTORNEY

Patented Aug. 12, 1924.

1,504,405

UNITED STATES PATENT OFFICE.

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY.

SAFETY SHAFT COUPLING.

Application filed March 18, 1922. Serial No. 544,716.

*To all whom it may concern:*

Be it known that I, IRVING F. WEBB, a citizen of the United States, residing at Elizabeth, in the county of Union and State of New Jersey, have invented certain new and useful Improvements in Safety Shaft Couplings, of which the following is a specification, reference being had therein to the accompanying drawings.

This invention relates to safety shaft-couplings of the clutch-roll type and has for an object to provide a safety shaft-coupling, the parts of which are few in number and of simple shapes such that they may be easily machined and assembled. A further object of the invention is to provide a safety shaft-coupling which will effectively grip the shaft when the latter is turned in either direction, regardless of whether the clutch-roll happens to lie above, below or on either side of the shaft when the torque is first applied to the latter.

The invention, as embodied in a coupling for abutted shaft-sections, comprises a body-member preferably cylindrical in form and having an axial aperture adapted to receive the abutted shaft-sections. The body-member is formed at each end of the shaft-aperture with a clutch-roll chamber having an eccentric wall between which and the adjacent shaft-section is positioned a cylindrical clutch-roll. The clutch-roll is longer than the clutch-roll chamber and extends exteriorly thereof, beyond the end of the body-member where it is connected to the shaft-section to turn with the latter, preferably by being received in an aperture in a collar adapted to be tightened upon the shaft-section. Preferably, the collar has fitted thereto a keeper adapted to enter a circumferential groove in the outer end of the clutch-roll to hold it in assembled relation with its carrying member. By extending the outer end of the clutch-roll beyond the end of the body-member and connecting it to turn with the shaft-section, the roll will invariably be carried into clutching engagement between the shaft-section and the eccentric wall of the clutch-roll chamber when the shaft and body-member are relatively rotated, even though the roll happens to be directly below the shaft when the shaft is initially turned.

Figure 1:
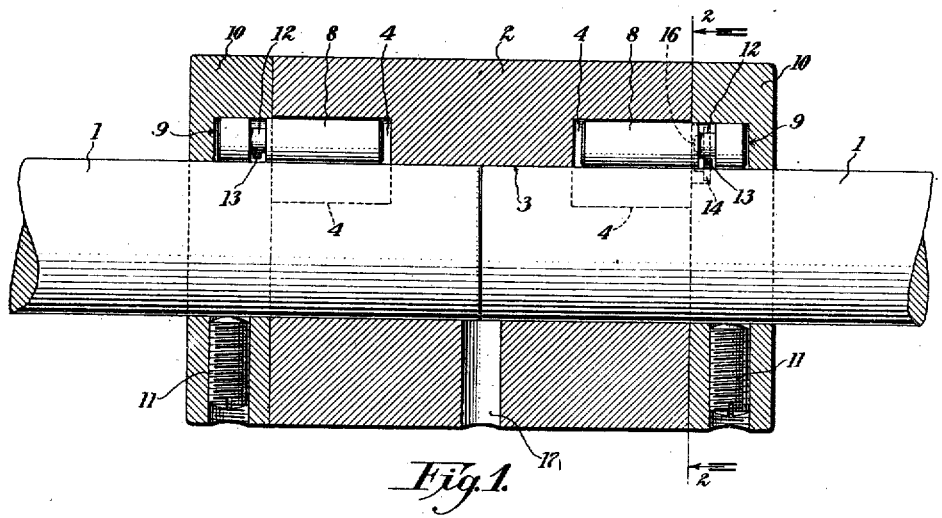
Figure 2:
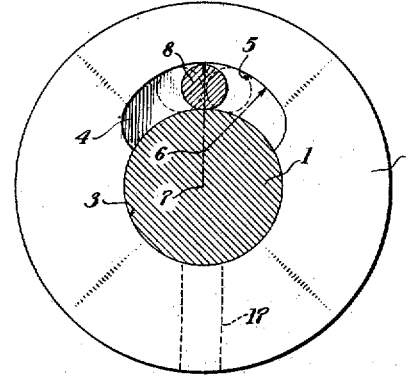
Figure 3:
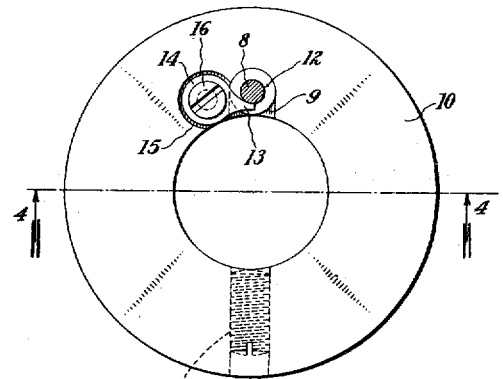
Figures 4, 5:
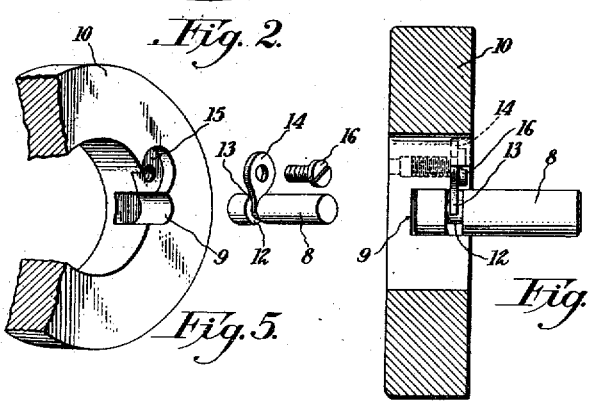

In the accompanying drawings, Fig. 1 is a longitudinal section through a shaft-coupling embodying the invention. Fig. 2 is a section on the line 2, 2, Fig. 1. Fig. 3 is an inner face view of one of the duplicate collar members; the clutch-roll being sectioned through its grooved portion. Fig. 4 is a section on the line 4, 4 of Fig. 3 and Fig. 5 is a disassembled perspective view of the collar and clutch-roll assembly shown in Figs. 3 and 4.

The invention is illustrated as embodied in duplicate in a coupling for abutted shaft-sections 1, 1 and preferably comprises a cylindrical body 2 formed with a longitudinal central shaft aperture 3 at the opposite ends of which the body-member is cut away to form the clutch-roll chambers 4, 4 each of which is formed with a clutch wall 5 curved concentrically with the center 6, Fig. 2, which is eccentric to or spaced above the center 7 of the shaft aperture 3 or, in other words, is between the shaft center 7 and the clutch wall 5. The clutch-roll chambers 4 need not extend over more than about one-third of the circumference of the shaft aperture. Disposed in each clutch-roll chamber 4 is a cylindrical clutch-roll 8 the diameter of which is slightly less than the distance from the corresponding shaft-section 1 to the central or deepest portion of the clutch-roll chamber 4 measured radially of the shaft-section 1, as shown in Fig. 2. Each clutch-roll 8 is longer than its receiving chamber 4 and extends beyond the corresponding end of the body-member 2 and preferably into an aperture 9 in the corresponding collar member 10 having a radial set-screw 11 whereby it may be tightly secured to its corresponding shaft-section with its inner face opposed to the corresponding end face of the body-member 2. The clutch-roll aperture 9 is in communication with or, in other words, opens into the shaft aperture 3 so that the clutch-roll may engage the shaft 1 and have the limited play radially of the shaft essential to the action of a roll-clutch.

The projecting end-portion of the clutch-roll 8 which enters the collar 10 is preferably circumferentially grooved at 12 to receive the finger 13 of a keeper 14 let into a recess 15 in the inner face of the corresponding collar 10 and secured in place by a screw 16. The keeper 14 holds the clutch-roll 8 and its collar 10 in assembled relation and prevents loss of the clutch-roll when the coupling is being assembled or taken apart.

When a torque is applied to a shaft-section 1 in either direction, the corresponding clutch-roll carrier or collar 10 first carries its clutch-roll into wedging relation with the shaft-section 1 and eccentric wall 5 of the clutch-roll chamber, whereupon the torque is effectively transmitted to the body-member 2 and thence through the other clutch-roll to the adjacent shaft section.

The body-member 2 may be provided with a radial aperture 17 for reception of a tool by which the body-member may be turned to unlock the coupling preparatory to disassembling the shaft-sections.

It will be evident that as the direction of rotation of either shaft-section 1 is reversed, the shaft-section will be unlocked from the body-member 1 and, since the clutch-roll is mounted to turn with the shaft-section through the agency of its supporting collar 10, it follows that a minimum turning movement of the shaft is required to carry the roll from one of its driving or dotted line positions, Fig. 2, across the central position to the other dotted line or driving position. The provision of the clutch-roll chambers which are open at the ends of the body-member is a feature of importance in conjunction with the clutch-rolls which are connected to turn with the shaft-sections, since it permits of the assembling of the clutch-rolls on the shaft-sections preparatory to insertion of the shaft-sections in the body-member.

The invention is not, of course, limited to its use in duplicate for coupling abutted shaft-sections, but may be used for coupling a shaft to a hollow member of any of the various types commonly used in machinery.

Having thus set forth the nature of the invention, what I claim herein is:—

1. In a coupling device, a body-member having a shaft aperture and a clutch-roll chamber adjacent said shaft aperture, said chamber having an eccentric wall, a clutch-roll disposed in said chamber and projecting outwardly beyond the end of said body-member, and means external to said body-member for connecting said clutch-roll to rotate with a shaft-section in contact with the latter.

2. In a coupling device, a body-member having a shaft aperture and a clutch-roll chamber adjacent said shaft aperture, said chamber having an eccentric wall, a clutch-roll disposed in said chamber so as to contact with a shaft-section and projecting outwardly beyond the end of said body-member, and a collar adapted to be secured to a shaft-section adjacent the end of the body-member and formed with an aperture entered by the outwardly projecting end of said clutch roll.

3. In a coupling device, a body-member having a shaft aperture and a clutch-roll chamber adjacent said shaft aperture, said chamber having an eccentric wall, a clutch-roll disposed in said chamber so as to contact with a shaft-section and projecting outwardly beyond the end of said body-member, a collar adapted to be secured to a shaft-section adjacent the end of the body-member and formed with an aperture entered by the projecting end of said clutch-roll, and a keeper for holding said roll and collar in assembled relation.

4. In a coupling device, a body-member having a shaft aperture and a clutch-roll chamber adjacent said shaft aperture, said chamber having an eccentric wall, a grooved clutch-roll disposed in said chamber and projecting outwardly beyond the end of said body-member, and a keeper secured to said collar and entering the groove in the clutch-roll.

5. In a coupling device, a body-member having a shaft aperture and a clutch-roll chamber adjacent said shaft aperture, said chamber having an eccentric wall, a grooved clutch-roll disposed in said chamber and projecting outwardly beyond the end of said body-member, and a keeper let into the inner face of said collar and having a projection entering the groove in the clutch-roll.

6. In a coupling device, a body-member having a shaft aperture and a clutch-roll chamber adjacent said shaft aperture and open at the end of the body-member, said chamber having an eccentric wall with a deepened central portion and shallower portions at each side of said central portion, a collar member adapted to be secured to a shaft-section, a single clutch-roll secured at one end only to said collar against withdrawal therefrom and free of support at its opposite end, said roll being adapted to be inserted in said clutch-roll chamber while in assembled relation with its collar and a shaft-section.

7. In a coupling device, a body-member having a shaft aperture and a clutch-roll chamber adjacent the end of said shaft aperture, said clutch-roll chamber having an eccentric wall and being open at its end adjacent the end of the body-member, a clutch-roll carrier adapted to be secured to turn with a shaft-section preparatory to insertion of the latter in the body-member, and a cylindrical clutch-roll secured at one end only to said carrier against separation from the latter.

In testimony whereof, I have signed my name to this specification.

IRVING F. WEBB.